(12) United States Patent
Kubohara et al.

(10) Patent No.: US 7,522,364 B2
(45) Date of Patent: Apr. 21, 2009

(54) CONTROL CIRCUIT FOR INFORMATION STORAGE DEVICE

(75) Inventors: Ryuki Kubohara, Kawasaki (JP); Isamu Tomita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 465 days.

(21) Appl. No.: 11/345,470

(22) Filed: Feb. 1, 2006

(65) Prior Publication Data

US 2006/0280485 A1    Dec. 14, 2006

(30) Foreign Application Priority Data

Jun. 9, 2005  (JP) .............................. 2005-170057

(51) Int. Cl.
*G11B 5/09* (2006.01)
*G11B 5/596* (2006.01)

(52) U.S. Cl. ..................................... 360/51; 360/78.08

(58) Field of Classification Search .................... None
See application file for complete search history.

(56) References Cited

U.S. PATENT DOCUMENTS 6,735,540 B2 * 5/2004 Pedrazzini et al. ............ 702/79
2003/0185115 A1 * 10/2003 Yamamoto et al. ......... 369/47.3

FOREIGN PATENT DOCUMENTS

JP         5-012781         1/1993

* cited by examiner

*Primary Examiner*—Joseph H Feild
*Assistant Examiner*—Daniell L Negrón
(74) *Attorney, Agent, or Firm*—Greer, Burns & Crain, Ltd.

(57) ABSTRACT

To reduce power consumption of an information storage device, a control circuit for the information storage device stops the supply of a formatter clock or an ECC unit clock simultaneously with a seek operation. When a clock stop time has elapsed by the time obtained by subtracting at least a time required for restarting the formatter or the ECC unit from a seek time, the control circuit restarts the supply of the formatter clock or the ECC unit clock.

3 Claims, 8 Drawing Sheets

FIG.4

| CYLINDER NUMBER | SEEK TIME |
|---|---|
| 0 | 0 |
| 1 | t1 |
| 2 | t2 |
| 3 | t3 |
| . | . |
| . | . |
| . | . |
| n | tn |

CONTROL CIRCUIT FOR INFORMATION STORAGE DEVICE

BACKGROUND OF THE INVENTION

1. Field of the Invention

The present invention relates to means for reducing power consumption of an information storage device.

2. Description of the Related Art

To increase the data transfer rate when reading or writing data from or into a medium or to improve the positional precision in servo control in accordance with the increased recording density, the power consumption of information storage devices, such as magnetic disk units, is increasing. When developing magnetic disk units replacing known disk units, the power consumption in accordance with the basic specifications of replacing magnetic disk units should be smaller than or equivalent to that of known magnetic disk units. Accordingly, it is necessary to reduce the power consumption by performing power saving more actively than ever.

In known magnetic disk units, during a seek operation, a formatter or an error checking and correction (ECC) unit continues to operate even if such an operation is not necessary, thereby increasing the power consumption.

One basic technology for reducing the power consumption is to set reading/writing circuits disposed on a data transfer path to be a low power consumption state (clock output is suspended) during a seek operation, as disclosed in Japanese Unexamined Patent Publication (Kokai) No. 5-12781.

In the invention of the above publication, however, even if the supply of the clock to the formatter or the ECC unit is restarted after the seek operation is finished, the read/write operation cannot be performed immediately since a certain time is required to restart the formatter or the ECC unit.

SUMMARY OF THE INVENTION

Accordingly, it is an object of the present invention to provide a control circuit for an information storage device in which, after the supply of a clock is stopped, it is restarted at a suitable time to resume a read/write operation immediately.

To achieve the above object, during a seek operation by reading servo information prerecorded in a medium and by performing tracking control to move a head to a target track, the control circuit stops the supply of a clock to a formatter or an ECC unit. The control circuit then restarts the supply of the clock to the formatter or the ECC unit before the seek operation is finished.

As a result, the power consumption during the seek operation can be reduced.

These and other objects, features and advantages of the present invention will become more apparent upon reading of the following detailed description along with the accompanied drawings.

BRIEF DESCRIPTION OF THE DRAWINGS

FIG. 4 is a seek table for referring to the seek time;

DESCRIPTION OF THE PREFERRED EMBODIMENTS

The present invention is described in detail below with reference to the accompanying drawings through illustration of preferred embodiments.

The following configuration, which simplifies the control performed by firmware, is a feature of the present invention. A time management timer is disposed, and a certain time is set in the timer by considering a time for starting a formatter or an ECC unit and a seek operation end time. When the seek operation is finished, a clock is supplied to the formatter or the ECC unit automatically.

First Embodiment

Figure 1:
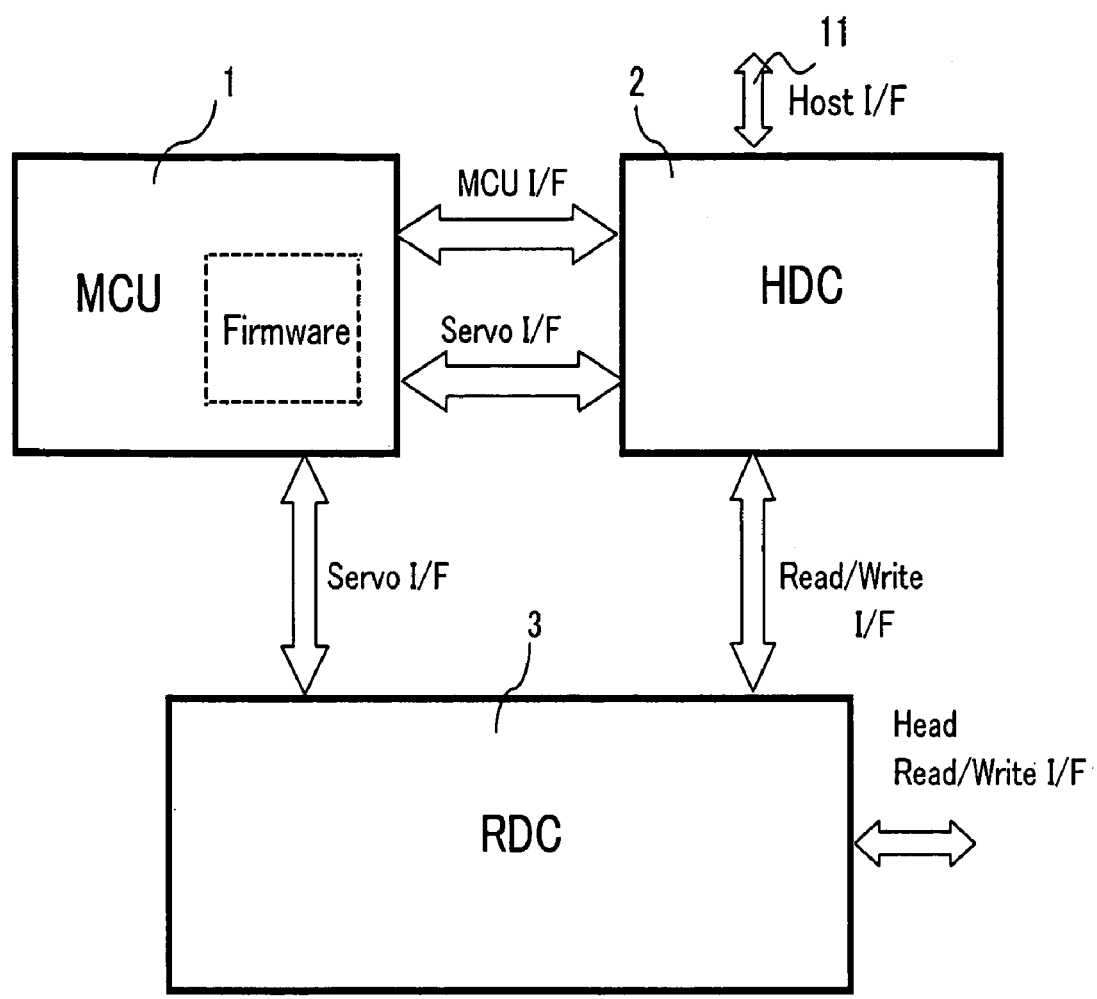
FIG. 1 is a block diagram illustrating a main circuit according to a first, second, or third embodiment of the present invention.

FIG. 1 is a block diagram illustrating a main circuit according to a first embodiment of the present invention. The main circuit includes a microprocessor (MCU) 1, a hard disk controller (HDC) 2, and a read channel (RDC) 3.

The HDC 2 is connected to a magnetic disk unit of an embodiment of the present invention and an external host computer (host) via a host interface 11. The HDC 2 has the function of controlling the reading or writing of data from or into a medium in response to a read or write command from the host under the firmware control of the MCU 1. The RDC 3 has the function of decoding servo information prerecorded in a medium and the function of decoding read data and encoding write data.

Figure 2:
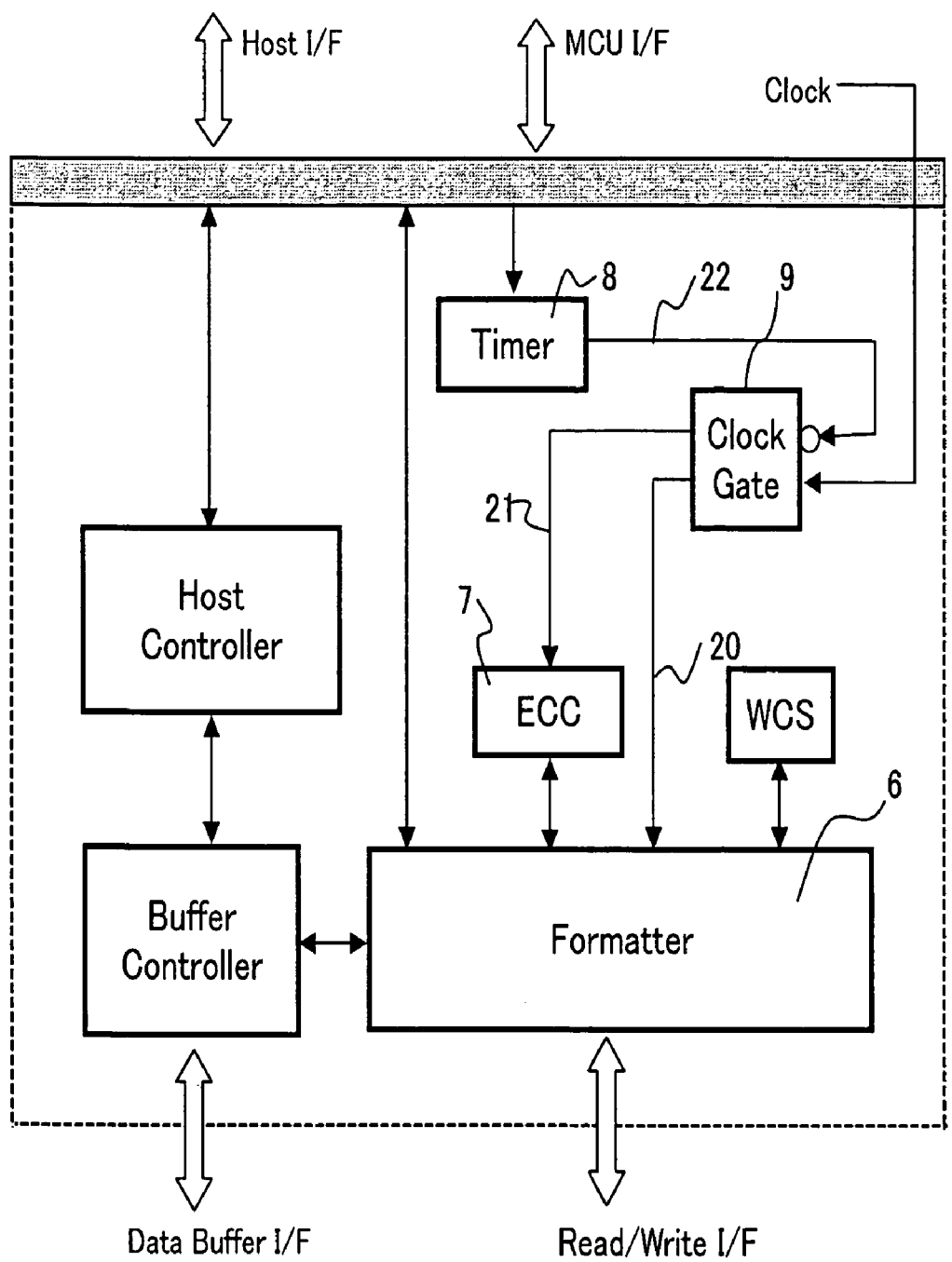
FIG. 2 is a block diagram illustrating the internal configuration of a hard disk controller (HDC) according to the first embodiment.

FIG. 2 is a block diagram illustrating the internal configuration of the HDC 2. The HDC 2 includes a formatter 6, an ECC unit 7, a timer 8, and a clock stop gate 9.

The formatter 6 has the function of performing data conversion in accordance with a medium format by adding an ECC/CRC to data supplied from a data buffer during the write operation, and has the function of reconstructing the ECC/CRC of data read from a medium and transferring the data to the data buffer during the read operation. The ECC unit 7 has the function of generating ECC/CRC data during the write operation, and the function of performing error correction or error checking based on the ECC/CRC data obtained from the read data during the read operation.

During the seek operation to perform tracking control to move a head to a track from or into which data is read or written based on servo information, the clock stop gate 9 stops the supply of a formatter clock 20 and an ECC unit clock 21 to the formatter 6 and the ECC unit 7, respectively, for power reduction. The supply of the clocks 20 and 21 is also stopped while the HDC 2 is waiting for a command from the host.

Figure 3:
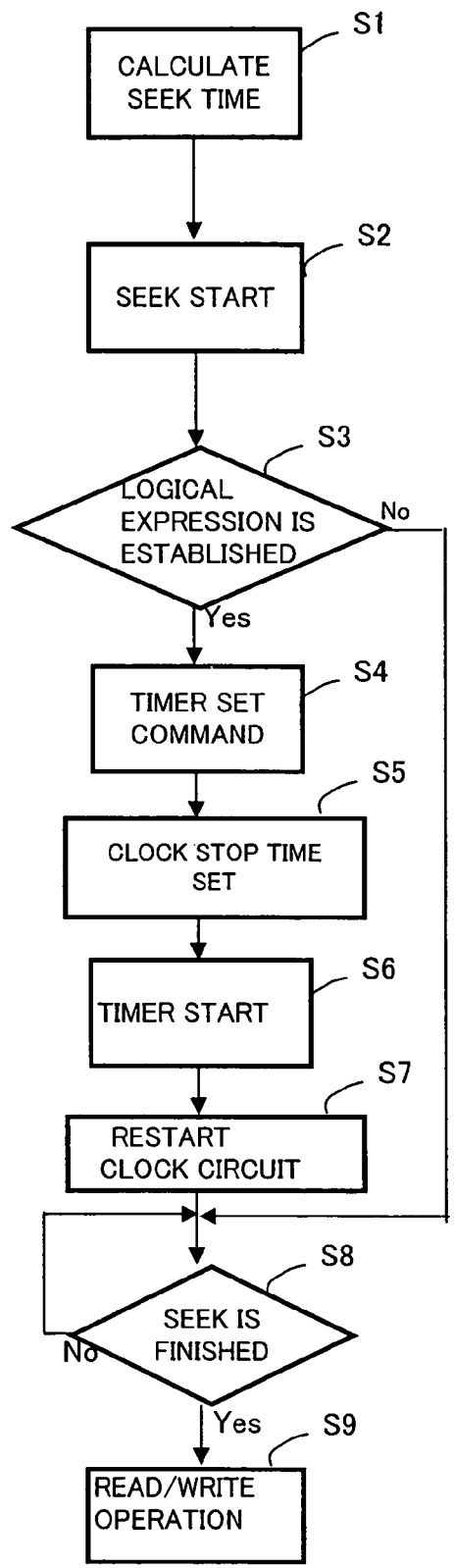
FIG. 3 is a flowchart illustrating a clock stop/restart control operation according to the first embodiment.
Figure 5:
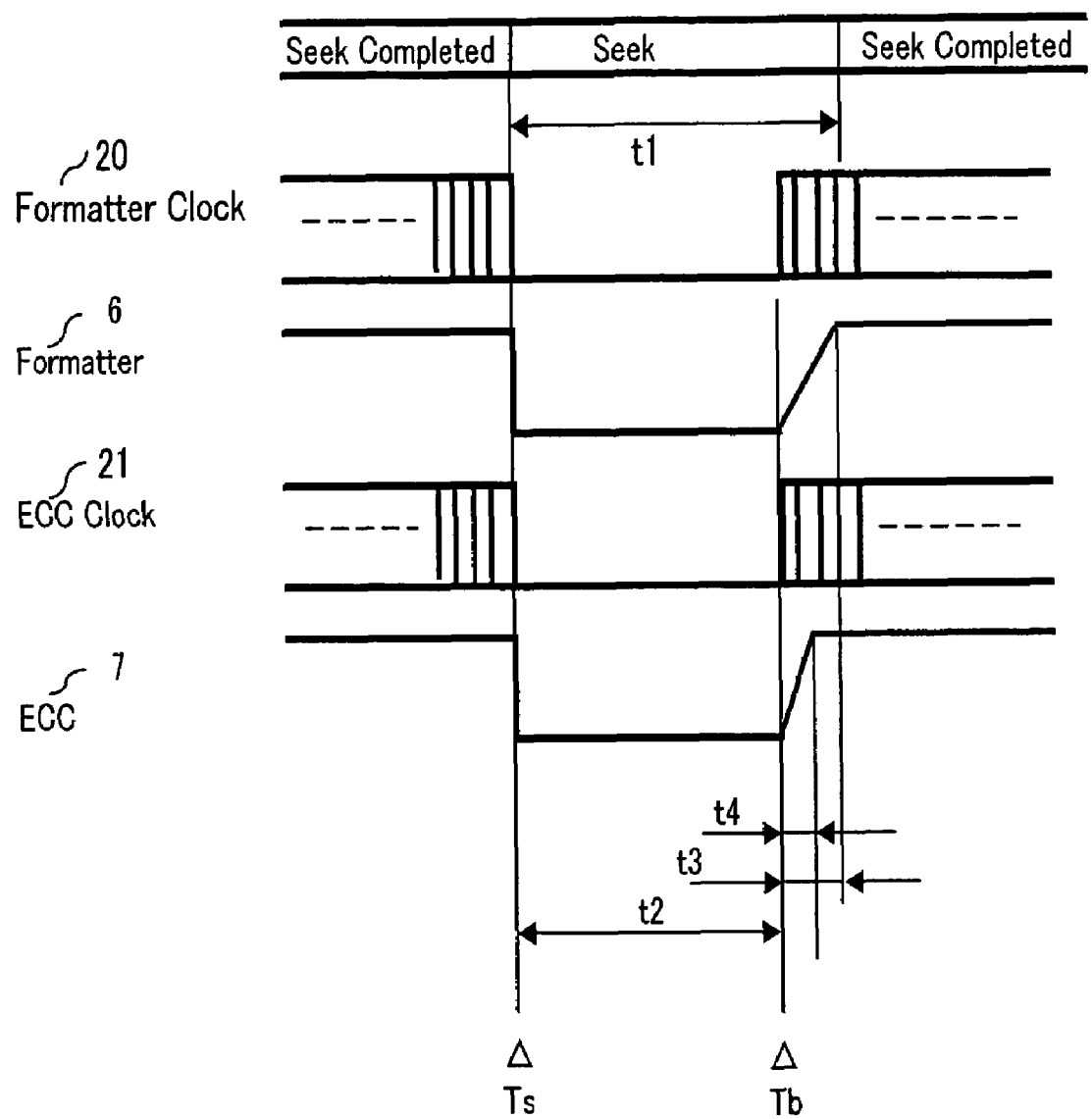
FIG. 5 is a time chart illustrating a timing control operation according to the first embodiment.

The clock start control operation for the clocks 20 and 21, which is a feature of the embodiment of the present invention, is described in detail below with reference to FIGS. 3 through 5. FIG. 3 is a flowchart illustrating the clock stop/restart control operation, FIG. 4 is a seek table, and FIG. 5 is a time chart.

Upon receiving a command from the host, the firmware converts instructed address information into a physical address having a cylinder number/head number/sector number in accordance with the medium format. The firmware then starts the seek operation by performing tracking control to move the head to the cylinder number. The firmware first calculates the difference between the cylinder number at the current position of the head and the cylinder number at the target position to obtain the required seek time from the seek table shown in FIG. 4.

The clock stop/restart (start) control sequence of the clocks 20 and 21 is described below with reference to FIG. 3.

In step S1, the firmware of the MCU 1 calculates the seek time from the cylinder number of the physical address. In step S2, the firmware then starts the seek operation to move the head to the target cylinder. In step S3, it is determined whether the seek time is greater than the sum of the formatter setting time, the clock circuit start time, and the formatter start time according to logical expression (1).

$$\text{Seek time} > \text{formatter setting time} + \text{clock circuit start time} + \text{formatter start time} \quad (1)$$

If logical expression (1) is established (the outcome of step S3 is YES), the process proceeds to step S4 in which a timer set command is sent to the HDC 2. If logical expression (1) is not established (the outcome of step S3 is NO), the supply of the clocks 20 and 21 is not stopped since there is no time to stop and restart the clocks 20 and 21 during the seek time. In logical expression (1), the seek time indicates the time required for the seek operation, i.e., from when the seek operation is started to when the seek operation is finished, the formatter setting time indicates the time required for setting the physical address and various items of information for the RDC 3, the clock circuit start time indicates the time required for restarting the clocks 20 and 21 under the normal conditions after releasing the clock stop gate 9, and the formatter start time indicates the time required for restarting the formatter 6 and the ECC unit 7 under the normal conditions after supplying the clocks 20 and 21.

In step S5, a clock stop time, which is a clock restart time, instructed in the timer set command supplied from the MCU 1 is set in the timer 8 of the HDC 2. The clock stop time is equal to the time obtained by subtracting the time required for restarting the clocks from the seek time, as expressed by logical equation (2).

$$\text{Clock stop time} = \text{seek time} - (\text{formatter setting time} + \text{clock circuit start time} + \text{formatter start time}) \quad (2)$$

After setting the clock stop time in step 5, in step S6, the timer 8 starts counting to stop the clocks.

In step S7, after the lapse of the clock stop time set in the timer 8 (when the time is up), the clock stop gate 9 automatically restarts the clock circuit since an output 22 of the timer 8 is connected to the clock stop gate 9.

It is then determined in step S8 whether the seek operation is finished. If the seek operation is found to be finished in step S8, the process proceeds to step S9 in which the read/write operation is performed. If the seek operation is not yet finished, step S8 is repeated until the seek operation is finished.

The timing control performed when logical expression (1) is established (the outcome of step S3 is YES) is described below with reference to FIG. 5. In FIGS. 5, 20 and 21 indicate the formatter clock and the ECC unit clock, respectively, and t1 and t2 represent the seek time and the clock stop time, respectively. In response to the setting of the clock stop time in the timer 8, the timer stop gate 9 stops the clocks 20 and 21 at time Ts substantially simultaneously with the start of the seek operation. After the lapse of time t2, the timer 8 times up to start the clocks 20 and 21 at time Tb. Time t3 and t4 indicate the times required for restarting the formatter 6 and the ECC unit 7, respectively, under the normal conditions after the clocks are supplied.

In the first embodiment, the formatter clock 20 and the ECC unit clock 21 are stopped and restarted at the same time. However, in order to further reduce the power consumption, the formatter clock 20 and the ECC unit clock 21 can be stopped and restarted at different times.

Second Embodiment

Figure 6:
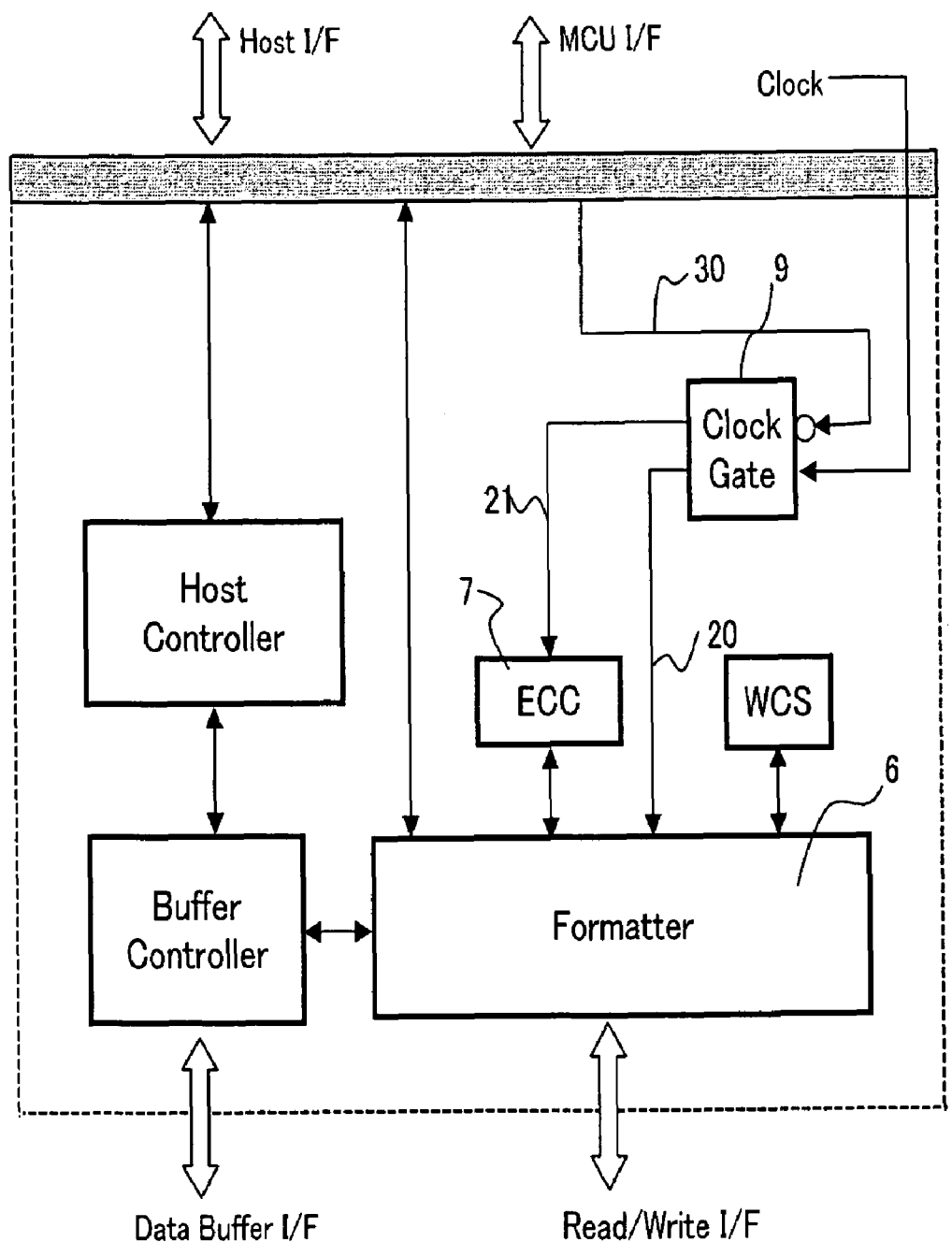
FIG. 6 is a block diagram illustrating the internal configuration of the HDC according to the second embodiment.
Figure 7:
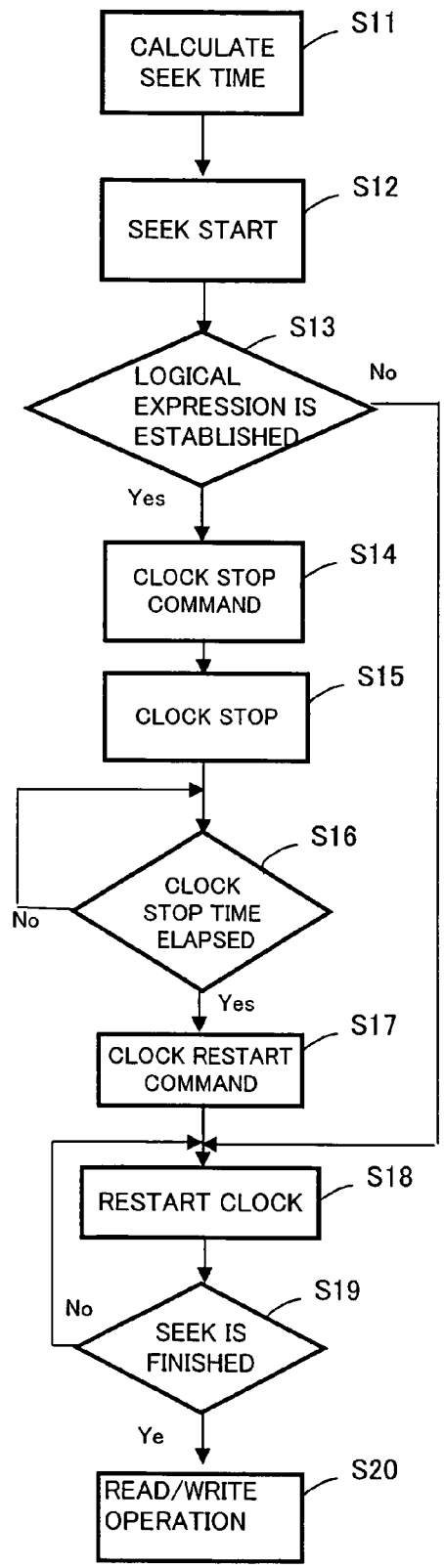
FIG. 7 is a flowchart illustrating a clock stop/restart control operation according to the second embodiment.

A second embodiment of the present invention is discussed below with reference to FIGS. 1, 6, and 7. FIG. 1 is a block diagram illustrating the main circuit according to a second embodiment of the present invention, which is the same as that of the first embodiment. FIG. 6 is a block diagram illustrating the internal configuration of the HDC 2 according to the second embodiment of the present invention. FIG. 7 is a flowchart illustrating the clock stop/restart control operation. In FIGS. 1, 6, and 7, the same elements as those of the first embodiment are designated with like reference numerals, and an explanation thereof is thus omitted.

The second embodiment is different from the first embodiment in that the timer 8 is not disposed in the HDC 2, and instead, the clock stop/restart (start) operation is entirely performed by the firmware of the MCU 1.

The control sequence for the stop/restart (start) operation of the clocks 20 and 21 is described below with reference to the flowchart of FIG. 7.

In step S11, the firmware of the MCU 1 calculates the seek time from the cylinder number of the physical address. In step S12, the firmware then starts the seek operation to move the head to the target cylinder.

It is then determined in step S13 whether logical expression (1) shown in FIG. 3 is established. If it is determined in step S13 that logical expression (1) is established, the process proceeds to step S14 in which the MCU 1 sends a clock stop command to the HDC 2. If it is determined in step S13 that logical expression (1) is not established, the clocks are not stopped since there is no time to stop/restart (start) the clocks.

In step S15, in response to the clock stop command, the clock stop gate 9 stops the supply of the clocks.

It is then determined by the monitoring of the firmware in step S16 whether the clock stop time (remaining time before restarting the clocks) has elapsed. The clock stop time is expressed by equation (2) shown in FIG. 3.

If the clock stop time has elapsed, the process proceeds to step S17 in which a clock restart command is sent to the HDC 2.

In step S18, in response to the clock restart command, the clock stop gate 9 restarts the supply of the clocks.

It is then determined in step S19 whether the seek operation is completed. If it is determined in step S19 that the seek operation is completed, the process proceeds to step S20 in which the read/write operation is performed. If the seek operation is not yet finished, the process returns to step S18, and steps S18 and S19 are repeated until the seek operation is finished.

Third Embodiment

Figure 8:
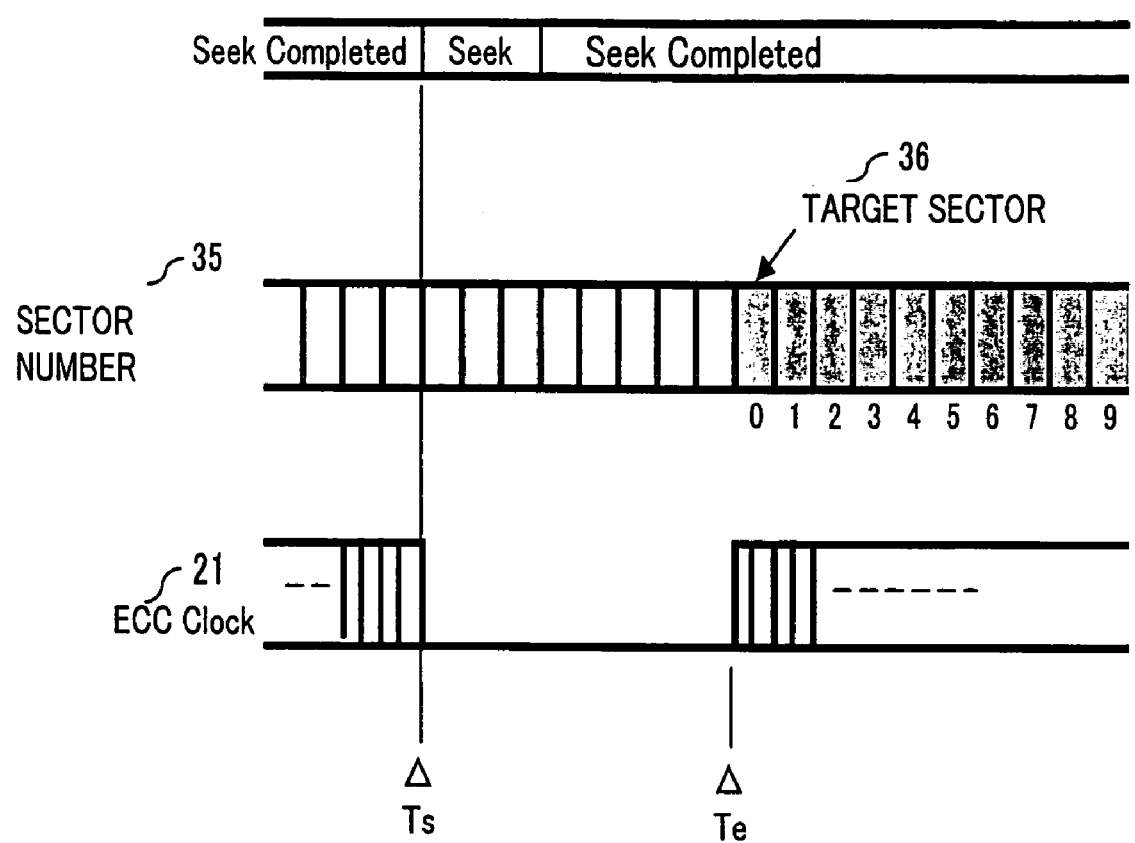
FIG. 8 is a time chart illustrating a clock start control operation according to the third embodiment.

FIG. 8 is a time chart according to a third embodiment of the present invention. In FIG. 8, 35 indicates the sector number of a track from or into which data is read or written, and 36 indicates a target sector from or into which data is read or written. Even if the head reaches the target track after finishing the seek operation in servo control, the head does not yet reach the target sector 36, and thus, a wait time is still required for the head to move at the maximum of one rotation. During this wait time, the function of the ECC unit 7 is not required, and thus, the ECC unit clock 21 can be stopped to further reduce the power consumption.

In the third embodiment, during this wait time, the supply of the ECC unit clock 21 is stopped in addition to the control operations in the first or second embodiment.

In FIG. 8, Ts indicates the seek start time, and Te indicates the time at which the ECC unit clock 21 is restarted.

This application is based on Japanese Patent Application serial no. 2005-170057 filed in Japan Patent Office on Jun. 9, 2005, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A control circuit for an information storage device, comprising:
    seek operation means for performing tracking control to move a head to a target track based on the servo information prerecorded in a medium;
    clock gate means for stopping a supply of a clock signals to a formatter unit and an ECC (error correcting and checking) unit during a seek operation and restarting the supply of the clock signals to the formatter unit and the ECC unit before the seek operation is finished; and
    time setting means for setting time obtained by subtracting at least a time required for restarting the formatter unit and the ECC unit from a seek time in a timer;
    wherein the clock gate means restarts the supply of the clock signals to the formatter unit and the ECC unit when the time set in the timer has elapsed.

2. A control circuit for an information storage device, comprising:
    seek operation means for performing tracking control to move a head to a target track based on the servo information prerecorded in a medium;
    clock gate means for stopping a supply of a clock signals to a formatter unit and an ECC (error correcting and checking) unit during a seek operation and restarting the supply of the clock signals to the formatter unit and the ECC unit before the seek operation is finished; and
    monitoring means for monitoring by firmware a clock stop time during which the clock signals are stopped;
    wherein the clock gate means restarts the supply of the clock signals to the formatter unit and the ECC unit when the clock stop time has elapsed by a time obtained by subtracting at least a time required for restarting the formatter unit and the ECC unit from a seek time.

3. A magnetic disk unit, comprising:
    seek operation means for performing tracking control to move a head to a target track based on the servo information prerecorded in a medium;
    clock gate means for stopping a supply of a clock signals to a formatter unit and an ECC (error correcting and checking) unit during a seek operation and restarting the supply of the clock signals to the formatter unit and the ECC unit before the seek operation is finished; and
    time setting means for setting time obtained by subtracting at least a time required for restarting the formatter unit and the ECC unit from a seek time in a timer;
    wherein the clock gate means restarts the supply of the clock signals to the formatter unit and the ECC unit when the time set in the timer has elapsed.

* * * * *